No. 695,944. Patented Mar. 25, 1902.
J. S. PECK.
SYSTEM OF ELECTRICAL DISTRIBUTION.
(Application filed May 18, 1901.)

(No Model.) 2 Sheets—Sheet 1.

WITNESSES:
C. L. Belcher
Birney Hines

INVENTOR
John S. Peck
BY
Wesley S. Carr
ATTORNEY.

No. 695,944. Patented Mar. 25, 1902.
J. S. PECK.
SYSTEM OF ELECTRICAL DISTRIBUTION.
(Application filed May 18, 1901.)
(No Model.)
2 Sheets—Sheet 2.

WITNESSES:
C. L. Belcher
Birney Hines

INVENTOR
John S. Peck
BY
Wesley G. Carr
ATTORNEY.

UNITED STATES PATENT OFFICE.

JOHN S. PECK, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

SPECIFICATION forming part of Letters Patent No. 695,944, dated March 25, 1902.

Application filed May 18, 1901. Serial No. 60,917. (No model.)

*To all whom it may concern:*

Be it known that I, JOHN S. PECK, a citizen of the United States, residing in Pittsburg, in the county of Allegheny and State of Pennsylvania, have invented a new and useful Improvement in Systems of Electrical Distribution, of which the following is a specification.

My invention relates to systems of electrical distribution, and particularly to such systems as involve the use of three-wire direct-current circuits for supplying translating devices with energy.

The object of my invention is to provide a system which involves the use of a single electrical machine and three-phase transformers of either the auto or two-circuit type which shall be combined in such manner as to obviate the magnetization of the transformer-cores by the current supplied to or taken from the windings by the balancing-conductor of the three-wire circuit.

My invention is illustrated in the accompanying drawings, in which—

Figure 1:
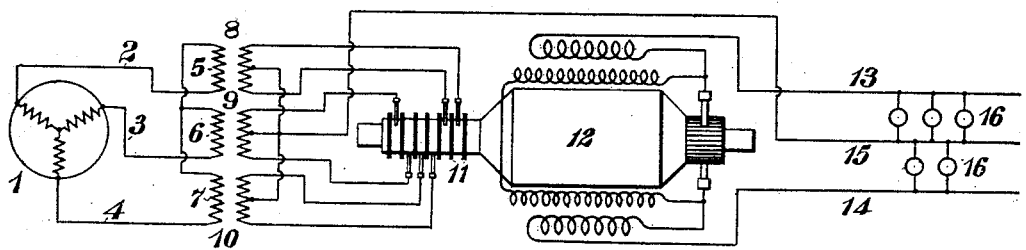
Figure 2:
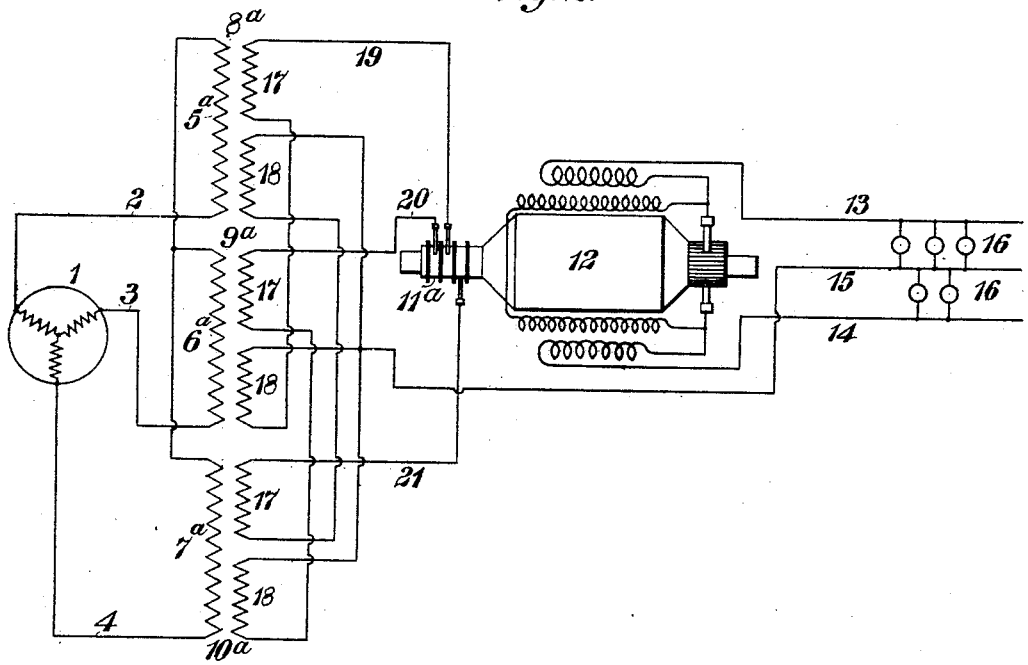
Figure 3:
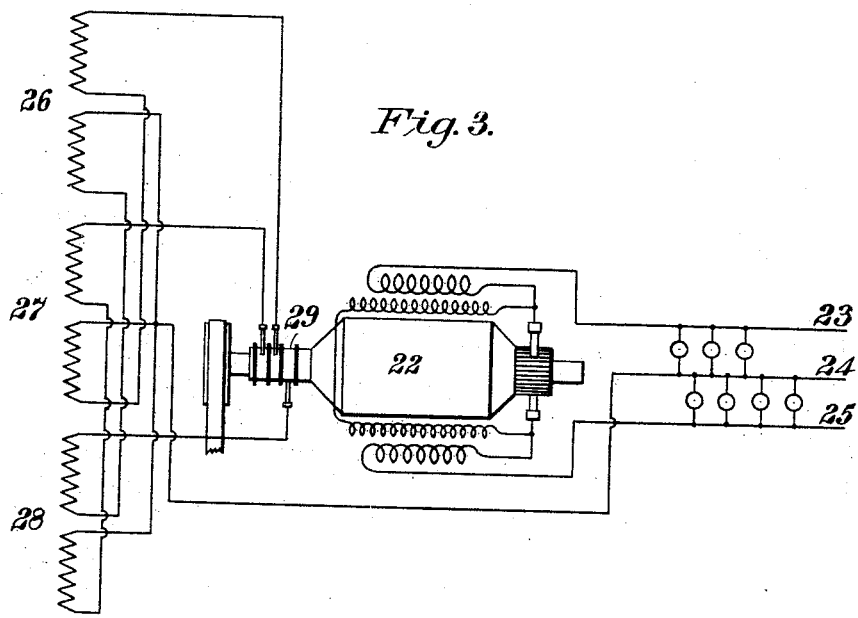
Figure 4:
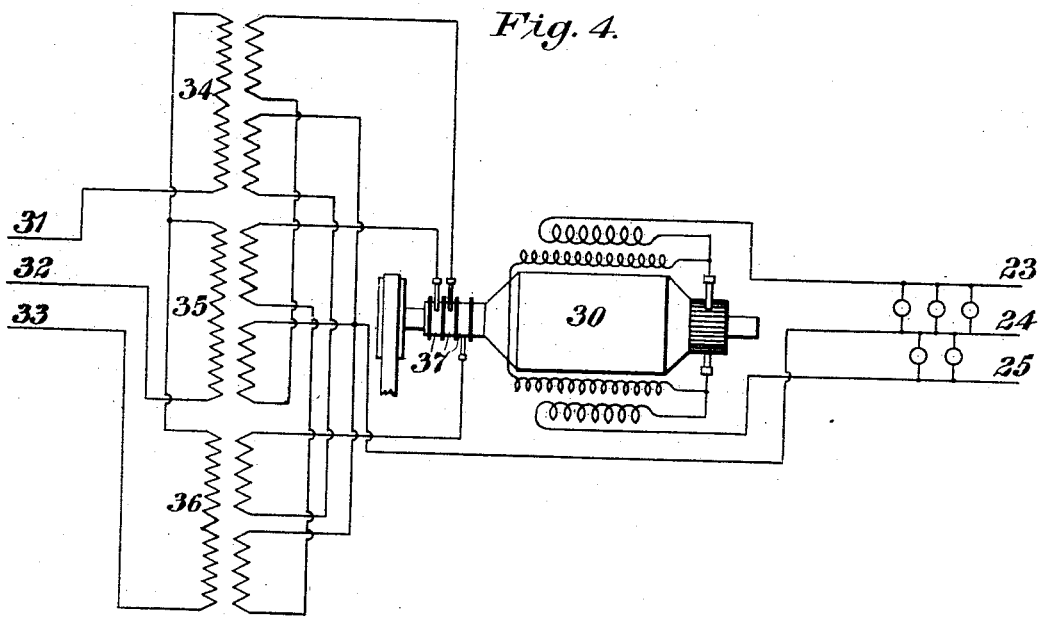

Figure 1 is a diagram of a three-wire direct-current circuit supplied with energy from a source of three-phase alternating currents through transformers and a rotary converter. Fig. 2 is a diagram similar to Fig. 1, but illustrates a modification. Fig. 3 is a diagram of a three-wire circuit supplied with energy from a single dynamo in conjunction with auto transformers arranged and connected in accordance with my invention. Fig. 4 is a diagram illustrating my invention as employed in connection with a dynamo for supplying energy to a three-phase alternating-current circuit and a three-wire direct-current circuit.

The general combination and arrangement of apparatus illustrated in Fig. 1 are the same as that set forth in Patent No. 607,621, granted to the Westinghouse Electric & Manufacturing Company as assignee of Benjamin G. Lamme on the 19th day of July, 1898. In such a system, however, if the rotary converter is supplied from a three-phase circuit through three transformers, the windings of which have the usual connections, it will be seen that the current flowing through the secondary winding from the balancing-conductor of the three-wire direct-current circuit will serve to magnetize the transformer-cores to substantially the saturation-point, and thus increase the iron losses and the amount of wattless current in the primary circuits. I propose to avoid these objectionable conditions by so connecting the balancing-conductor of the three-wire circuit to the secondary windings of the transformers that the currents flowing through the secondary windings by reason of such connection will be in opposition in the two halves of each winding, and thus neutralize each other, so far as magnetic effects are concerned.

In Fig. 1 of the drawings the three-phase generator 1 supplies energy through conductors 2, 3, and 4 to the primary windings 5, 6, and 7 of three transformers 8, 9, and 10. These primary windings are, as shown, joined in star connection to the conductors 2, 3, and 4. The secondary winding of each of the transformers 8, 9, and 10 has each terminal independently connected to one of a set of six collector-rings 11 on the shaft of the rotary converter 12. The rotary converter is thus operated to supply direct-current energy to distributing-conductors 13 and 14.

The balancing-conductor 15, between which and the conductors 13 and 14 translating devices 16 are connected, is connected to the middle point of the secondaries of the transformers 8, 9, and 10, so that any current flowing in either direction in this conductor 15 will flow in opposite directions through the two halves of each of the secondary windings of the transformers 8, 9, and 10, in consequence of which the magnetizing effect upon the transformer-cores will be zero.

In Fig. 2 the three-phase generator 1 supplies three-phase currents through conductors 2, 3, and 4 to the primary windings $5^a$, $6^a$, and $7^a$ of the transformers $8^a$, $9^a$, and $10^a$, the primary windings being connected to each other and to the conductors 2, 3, and 4 the same as the corresponding parts shown in Fig. 1. In this modification of the invention, however, the rotary converter 12 is provided with only three collector-rings $11^a$, and each of the transformers $8^a$, $9^a$, and $10^a$ is provided with two secondary windings 17 and 18, which are so joined in star connection to each other, to the conductors 19, 20, and 21, leading to the collector-rings 11ª, and to the balancing-conductor 15 that any current flowing through the balancing-conductor 15 in either direction will flow in opposite directions in the two windings 17 and 18 of each of the transformers.

Referring now to Fig. 3, the generator 22 is employed for supplying energy to the three-wire circuit 23, 24, and 25 substantially in the manner set forth in Patent No. 513,006, granted to Michael von Dolivo-Dobrowolsky on the 16th day of January, 1894, except that I have provided three sets of balancing-coils 26, 27, and 28, there being two coils in each set and all being connected together in star connection and to the collector-rings 29 and to the balancing-conductor 24 in substantially the same manner as the secondary windings shown in Fig. 2. The arrangement is therefore such that there will be no magnetization of the cores and no self-induction in the windings by reason of the current flowing through the balancing-conductor 24.

In the modification shown in Fig. 3 the balancing-coils may be located in the armature of the machine, provided there is sufficient space therefor, instead of locating them outside, as indicated.

In Fig. 4 of the drawings I have shown a double-end generator 30 for supplying the three-wire direct-current circuit 23, 24, and 25 and also a three-phase alternating-current circuit 31, 32, and 33 from the other end. In this case the transformers 34, 35, and 36 have their primary and secondary windings arranged and connected the same as the corresponding windings in Fig. 2, except that the primary windings are here connected to the collecter-rings 37 and are interconnected and joined in star connection to the balancing-conductor 24, the secondary windings being utilized for supplying the three-phase currents to the distributing-conductors 31, 32, and 33.

It will be understood that the balancing-windings which are employed in connection with the machines shown in Figs. 3 and 4 may be arranged and connected in the manner set forth in Fig. 1 and that in each modification the windings which are not connected to the balancing-conductor may have either the star or delta arrangement of connections, as may be desired. It will be further understood that my invention is not limited to particular types of machines or to any special combinations and arrangements of circuits, except in so far as limitations are imposed by the state of the art and expressed in the claims.

I claim as my invention—

1. The combination with an electrical machine for supplying energy to a three-wire, direct-current circuit, of three tranformers each of which has two windings that are connected to the armature of said electrical machine and are also reversely connected to the balancing-conductor of the three-wire circuit so that currents flowing through said balancing-conductor will exert zero magnetizing effects upon the transformer-cores.

2. The combination with an electrical machine for supplying energy to a three-wire, direct-current circuit, of three transformers each of which has two windings that are connected to the armature of said machine and also reversely connected to the balancing-conductor in star arrangement so that the said windings of each transformer are opposed to each other when traversed by balancing-current.

3. The combination with an electrical machine for supplying energy to a three-wire, direct-current circuit, of three transformers each of which has two secondary windings which are connected to the armature and are also reversely connected to the balancing-conductor of the three-wire circuit, whereby balancing-currents exert zero magnetizing effects upon the transformer-cores.

4. The combination with a rotary converter for converting three-phase, alternating-current energy into direct-current energy for three-wire circuits, of three transformers for supplying the energy to the converter, each of which has two secondary windings that are reversely connected to the balancing-conductor of the three-wire circuit, all of said secondary windings being coupled together in star connection.

5. The combination with a rotary converter for converting three-phase alternating-current energy into direct-current energy for three-wire circuits, of three transformers for supplying energy to the converter, each of which has two secondary windings that are reversely connected to the balancing-conductor of the three-wire circuit, all of said secondary windings being interconnected for supplying energy to the rotary converter.

In testimony whereof I have hereunto subscribed my name this 15th day of May, 1901.

JOHN S. PECK.

Witnesses:
 JAMES B. YOUNG,
 WESLEY G. CARR.